US012808480B2

(12) United States Patent
Waite et al.

(10) Patent No.: US 12,808,480 B2
(45) Date of Patent: Nov. 24, 2026

(54) SINGLE OR DUAL DISPLAY MOUNTING APPARATUS

(71) Applicant: Ergotron, Inc., St. Paul, MN (US)

(72) Inventors: John R. Waite, Otsego, MN (US); Matthew J. Janechek, Maplewood, MN (US); Nicholas Robert Swartz, Minneapolis, MN (US); Mustafa A. Ergun, Eden Prairie, MN (US); Robert William Fluhrer, Prior Lake, MN (US)

(73) Assignee: Ergotron, Inc., St. Paul, MN (US)

( * ) Notice: Subject to any disclaimer, the term of this patent is extended or adjusted under 35 U.S.C. 154(b) by 9 days.

(21) Appl. No.: 18/857,115

(22) PCT Filed: May 2, 2023

(86) PCT No.: PCT/US2023/020702
§ 371 (c)(1),
(2) Date: Oct. 15, 2024

(87) PCT Pub. No.: WO2023/215297
PCT Pub. Date: Nov. 9, 2023

(65) Prior Publication Data

US 2025/0251076 A1 Aug. 7, 2025

Related U.S. Application Data

(60) Provisional application No. 63/338,281, filed on May 4, 2022.

(51) Int. Cl.
*F16M 11/20* (2006.01)
*A47B 97/00* (2006.01)
*F16M 11/12* (2006.01)

(52) U.S. Cl.
CPC ......... *F16M 11/121* (2013.01); *A47B 97/001* (2013.01); *F16M 2200/066* (2013.01)

(58) Field of Classification Search
CPC .. F16M 11/121; F16M 11/20; F16M 11/2085; F16M 11/2092; F16M 11/2035;
(Continued)

(56) References Cited

U.S. PATENT DOCUMENTS

| | | | | |
|---|---|---|---|---|
| 7,380,760 B2 * | 6/2008 | Dittmer | F16M 11/041 | 248/278.1 |
| 7,448,584 B2 * | 11/2008 | Chen | F16M 13/02 | 248/920 |

(Continued)

FOREIGN PATENT DOCUMENTS

| | | |
|---|---|---|
| CN | 119213250 A | 12/2024 |
| DE | 112023002028 T5 | 2/2025 |
| WO | WO-2023215297 A1 | 11/2023 |

OTHER PUBLICATIONS

"International Application Serial No. PCT/US2023/020702, International Search Report mailed Jul. 26, 2023", 2 pgs.

(Continued)

*Primary Examiner* — Nkeisha Smith
(74) *Attorney, Agent, or Firm* — Schwegman Lundberg & Woessner, P.A.

(57) ABSTRACT

A display mounting system including a structural support bracket, an articulating arm assembly, and one or more display attachment brackets is described. The display mounting system is coupled to a structure to hold one or more flat panel displays, and it allows the user of the display mounting system to easily change the orientation of one or more flat panel displays according to user's preferences. The articulating arm assembly includes one or more pairs of pivotally connected arms. The one or more pairs of pivotally connected arms cooperate with each other in a single arm configuration, and the one or more pairs of pivotally connected arms move independently in a dual arm configuration. The articulating arm assembly is adapted to be recon- (Continued)

figured between the single arm configuration and the dual arm configuration.

20 Claims, 9 Drawing Sheets

(58) Field of Classification Search
CPC ........ F16M 2200/066; F16M 2200/065; A46B 97/001; H04N 5/645; H04N 5/655
USPC ........................................................ 248/277.1
See application file for complete search history.

(56) References Cited

U.S. PATENT DOCUMENTS

| | | | | |
|---|---|---|---|---|
| 7,487,943 | B1 * | 2/2009 | Gillespie | F16M 11/10 248/920 |
| 7,984,888 | B2 * | 7/2011 | Park | F16M 11/38 248/920 |
| 8,245,990 | B2 * | 8/2012 | Huang | F16M 13/02 248/920 |
| 8,693,172 | B2 * | 4/2014 | Russell | F16M 11/2085 361/679.01 |
| 8,888,062 | B2 * | 11/2014 | Novin | F16M 11/2014 361/679.01 |
| 9,357,846 | B2 * | 6/2016 | Hung | F16M 11/125 |
| 9,746,124 | B2 * | 8/2017 | Smed | F16M 11/10 |
| 9,797,544 | B1 * | 10/2017 | Smed | F16M 11/08 |
| 9,976,698 | B1 * | 5/2018 | Davis | F16M 11/2064 |
| 10,010,177 | B1 * | 7/2018 | Pei | F16M 13/02 |
| 10,145,503 | B2 * | 12/2018 | Feldman | F16M 11/00 |
| D852,790 | S * | 7/2019 | Pei | D14/239 |
| 10,563,811 | B2 * | 2/2020 | Pei | F16M 11/2085 |
| 10,595,634 | B2 * | 3/2020 | Pei | F16M 11/24 |
| 10,957,966 | B2 * | 3/2021 | Barkan | H01Q 11/10 |
| 11,137,105 | B2 * | 10/2021 | Vlaar | F16M 11/08 |
| 11,193,527 | B2 * | 12/2021 | Li | F16M 11/2092 |
| 11,215,313 | B1 * | 1/2022 | Beil | F16M 11/2014 |
| 11,754,217 | B2 * | 9/2023 | Leman | F16M 11/08 248/442.2 |
| 11,779,115 | B2 * | 10/2023 | Pei | F16M 11/08 248/277.1 |
| 12,031,666 | B2 * | 7/2024 | Pei | F16M 11/08 |
| 2003/0015632 | A1 * | 1/2003 | Dunn | F16M 11/10 248/122.1 |
| 2006/0065795 | A1 * | 3/2006 | Blackburn | F16M 13/02 248/122.1 |
| 2008/0006751 | A1 * | 1/2008 | Chen | F16M 11/2085 248/920 |
| 2009/0034178 | A1 * | 2/2009 | Le | F16M 11/2064 361/679.27 |
| 2009/0084913 | A1 | 4/2009 | Grabania et al. | |
| 2011/0019344 | A1 * | 1/2011 | Russell | F16M 13/02 361/679.01 |
| 2013/0082156 | A1 * | 4/2013 | Conner | F16M 11/2085 248/281.11 |
| 2013/0187019 | A1 * | 7/2013 | Dittmer | F16M 11/2085 248/277.1 |
| 2015/0060615 | A1 | 3/2015 | Liu | |
| 2015/0328397 | A1 * | 11/2015 | Bally | A47F 5/06 29/434 |
| 2015/0342351 | A1 * | 12/2015 | Hung | G09F 7/20 211/26 |
| 2016/0245458 | A1 * | 8/2016 | Hung | G09F 15/0018 |
| 2017/0085828 | A1 * | 3/2017 | Shen | F16M 11/2085 |
| 2019/0390817 | A1 * | 12/2019 | Pei | F16M 11/08 |
| 2020/0120305 | A1 * | 4/2020 | Pei | F16M 11/2085 |
| 2020/0340614 | A1 * | 10/2020 | Pei | F16M 11/08 |
| 2021/0010632 | A1 * | 1/2021 | Pei | F16M 13/02 |
| 2021/0247019 | A1 * | 8/2021 | Newville | F16M 11/121 |
| 2021/0247020 | A1 * | 8/2021 | Janechek | F16M 11/2092 |
| 2021/0332936 | A1 * | 10/2021 | Lyu | F16M 11/18 |
| 2023/0337821 | A1 * | 10/2023 | Welty | F16M 11/24 |

OTHER PUBLICATIONS

"International Application Serial No. PCT/US2023/020702, Written Opinion mailed Jul. 26, 2023", 5 pgs.
"International Application Serial No. PCT/US2023/020702, International Preliminary Report on Patentability mailed Nov. 14, 2024", 7 pgs.

* cited by examiner

SINGLE OR DUAL DISPLAY MOUNTING APPARATUS

CLAIM OF PRIORITY

This patent application is a 371 National Stage of PCT Application Serial No. PCT/US2023/020702, entitled "CONFIGURABLE ARM FOR MOUNTING SINGLE OR DUAL DISPLAYS," filed May 2, 2023, and published as WO 2023/215297 A1, on Nov. 9, 2023, which claims the benefit of priority of Waite, et al. U.S. Provisional Patent Application Ser. No. 63/338,281, entitled "CONFIGURABLE ARM FOR MOUNTING SINGLE OR DUAL DISPLAYS," filed on May 4, 2022, which are hereby incorporated by reference herein in their entirety.

TECHNICAL FIELD

This document pertains generally, but not by way of limitation, to electronic display mounting systems.

BACKGROUND

Electronic displays, e.g., flat panel displays, can be supported by a display mounting system to make them easily accessible by a user (e.g., to locate them over a desk surface). The mounting system can be freestanding (e.g., supported by a floor or by a desktop), coupled to a structure (e.g., a wall, pole, or desk surface), or mobile (e.g., attached to a wheeled base). The mounting system can allow the user to easily alter the orientation of the electronic display (e.g., change a height, an angle or a distance relative to the structure) to accommodate the user's varying postures during the use of the electronic display.

BRIEF DESCRIPTION OF THE DRAWINGS

The following drawings are illustrative of particular embodiments of the present invention and therefore do not limit the scope of the invention. The drawings are not to scale and are intended for use in conjunction with the explanations in the following detailed description. Like numerals may describe similar components in different views. Like numerals having different letter suffixes may represent different instances of similar components. The drawings illustrate generally, by way of example, but not by way of limitation, various embodiments discussed in the present document.

OVERVIEW

Figure 1:
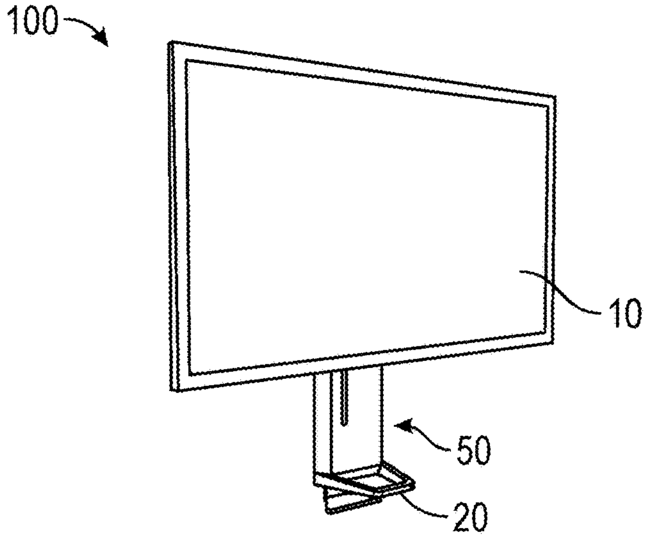
FIG. 1 is an isometric view of an example of an electronic display mounting system for a single electronic display.

This disclosure is directed to an electronic display mounting system to position one or more electronic displays relative to a structure (e.g., a wall, a desk, a pole, a cart, or the like). More particularly, the electronic display mounting system can include an articulating arm assembly that can be easily configured to hold the one or more electronic displays. The articulating arm assembly can be adapted to translate the one or more electronic displays relative to the structure.

DETAILED DESCRIPTION

The following detailed description is exemplary in nature and is not intended to limit the scope, applicability, or configuration of the invention in any way. Rather, the following description provides some practical illustrations for implementing exemplary embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

An electronic display device can be used for presentation of information (e.g., images, text, or video) which can be transmitted electronically. Electronic display devices can include television sets, computer monitors, digital signage, and others. In some example configurations, the electronic display device can be wired or wirelessly connected to an information source (e.g., a computer, a computing network, a cloud-based software, and others). In other example configurations, the electronic display device (also referred to in this disclosure as an "electronic display") can have a computer included inside the electronic display housing.

The electronic display device can be positioned in a location where its content (e.g., images) can be easily visible to a viewer. For example, in some example configurations, the electronic display device can be located proximate to a workstation, and it can be connected to a computer located proximate to the workstation. A user of the workstation can perform various computing functions (e.g., writing, drawing, calculating, and the like) while viewing images displayed on the electronic display device by the computer. In other example configurations, electronic display can be positioned over a wall, on a floor stand or on a wheeled base. An electronic display mounting system can be used to couple the electronic display to a structure in these various configurations.

In some example configurations, the electronic display mounting system can provide both height adjustment and articulation (e.g., tilt, pan, side motion, and forward or backward motion) for the electronic display. In other example configurations, the electronic display mounting system can only provide articulation for the electronic display. One or more electronic displays can be coupled to the electronic display mounting system. The present inventors have recognized that it would be desirable to easily convert the electronic display mounting system between a single display mounting configuration and a dual display mounting configuration. This disclosure describes various techniques to convert the electronic display mounting system between single and dual display mounting configurations.

Figure 2A:
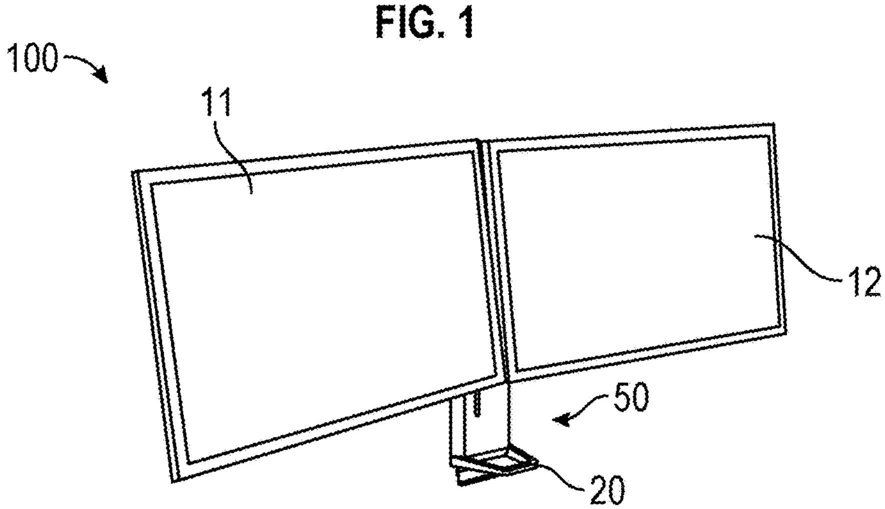
FIG. 2A is an isometric view of another example of an electronic display mounting system for two electronic displays.
Figure 2B:
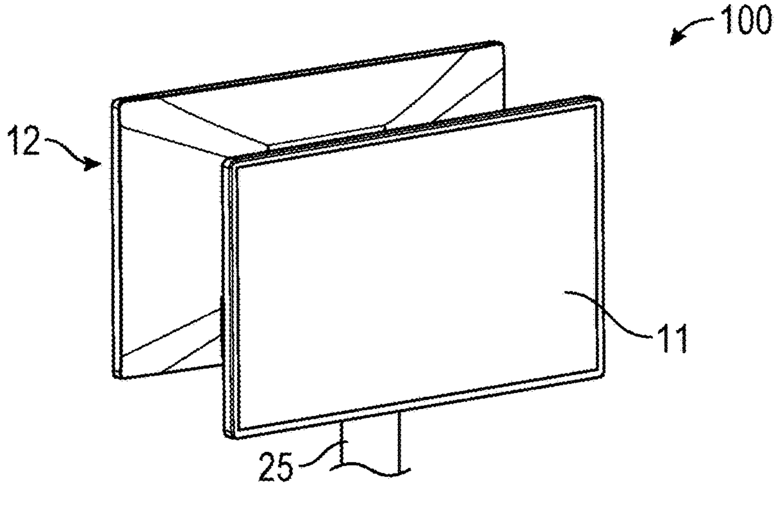
FIG. 2B is an isometric view of yet another example of an electronic display mounting system for two electronic displays.

FIGS. 1, 2A, and 2B are isometric views of example configurations of an electronic display mounting system 100. One or more electronic display devices (e.g., electronic display 10 of FIG. 1) can be coupled to the electronic display mounting system 100, such as shown in in FIG. 1. In other configurations, a first electronic display 11, and a second electronic display 12 can be coupled to the electronic display mounting system 100, such as shown in FIGS. 2A and 2B. In some example configurations, the electronic display mounting system 100 can be configured to hold the first electronic display 11 and the second electronic display 12 side by side in proximity facing the same direction as illustrated in FIG. 2A. In other example configurations, the electronic display mounting system 100 can be configured to hold the first electronic display 11 and the second electronic display 12 proximate to each other but facing different directions (e.g., positioned back-to-back facing opposite directions as illustrated in FIG. 2B). In yet other example configurations, the electronic display mounting system 100 can be adjustable to change the orientation of the first electronic display 11 and the second electronic display 12 selectively relative to each other depending on the needs of the user of the electronic display mounting system 100.

Figure 3:
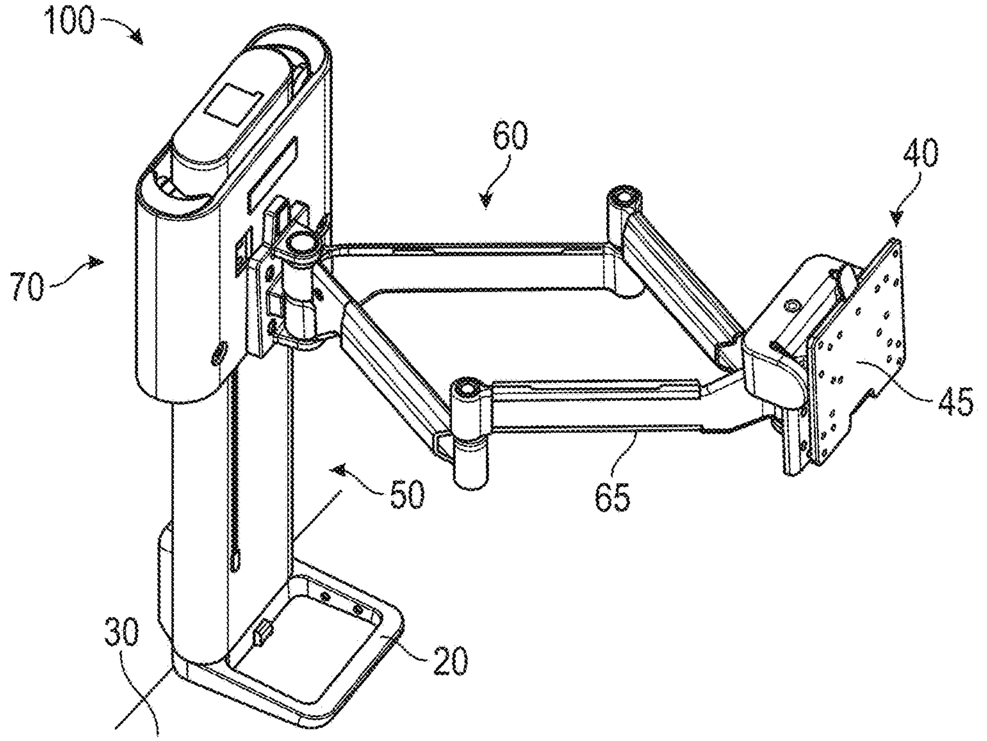
FIG. 3 is an isometric view of an example of an electronic display mounting system for holding a single electronic display over a desktop.
Figure 4:
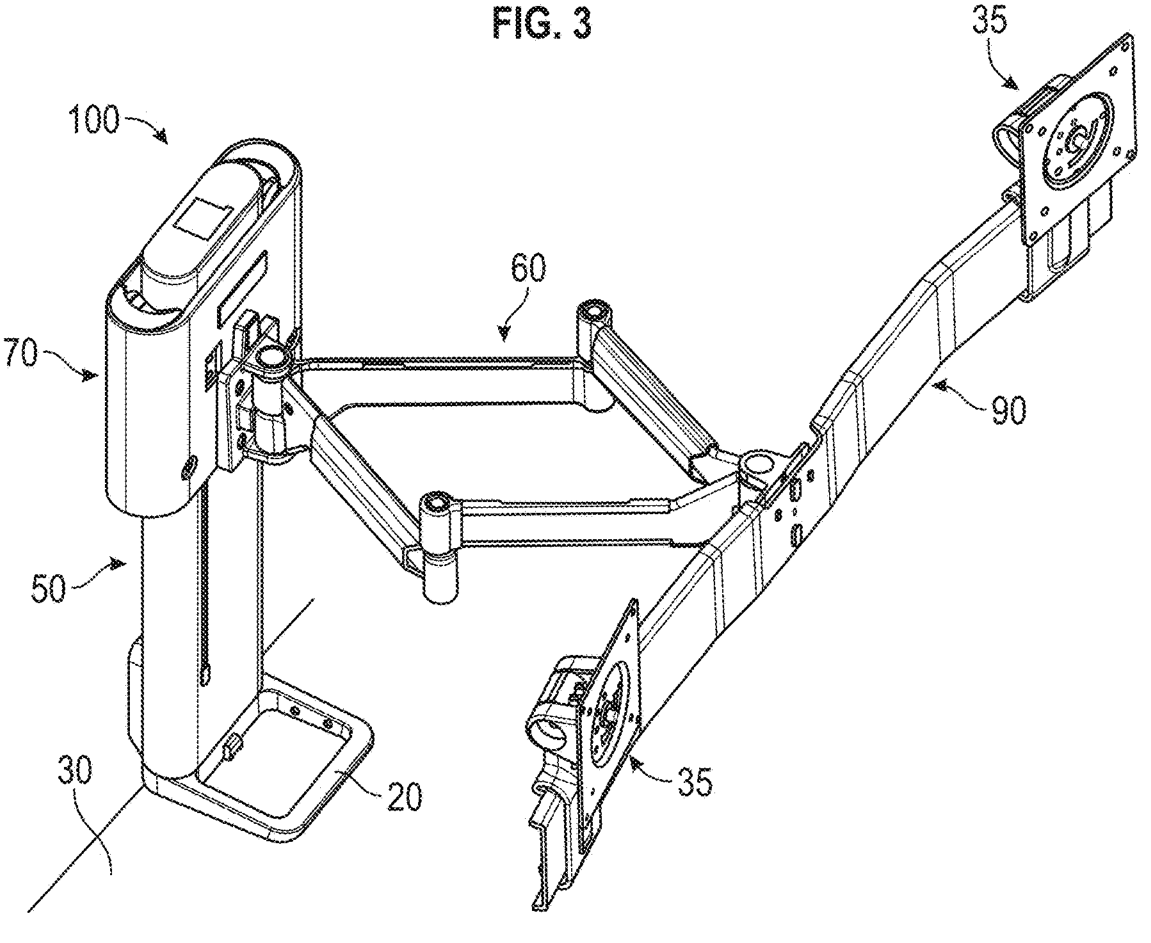
FIG. 4 is an isometric view of another example of an electronic display mounting system for holding two electronic displays over a desktop.

The electronic display mounting system 100, can be coupled to a structure (e.g., a desk surface, wall, pole, cabinet, mobile workstation, or the like). In some example configurations, the electronic display mounting system 100 can be coupled to a desk stand having a base 20 and a riser assembly 50 coupled to the base 20. The base 20 can be useful to couple the electronic display mounting system 100 to a workstation (e.g., a desk) as illustrated in FIGS. 3-4. In other configurations, the electronic display mounting system 100 can be coupled to a pole 25 as illustrated in FIG. 2B.

FIG. 3 is an isometric view of the electronic display mounting system 100 of FIG. 1. The electronic display mounting system 100 can be coupled to a desk surface 30 to hold an electronic display over the desk surface 30. In some example configurations, the electronic display mounting system 100 can include a base 20, a riser assembly 50, a truck assembly 70, an arm assembly 60, a tilt assembly 40, and a display attachment bracket 45.

The base 20 can be placed over a desk surface 30 and it can be coupled to a riser assembly 50. The riser assembly 50 can extend upward from the base 20. In some example configurations, the base 20 can be freestanding over the desk surface 30. In other example configurations, a clamp can be coupled to the base 20 to fixedly attach the electronic display mounting system 100 proximate an edge of the desk surface 30. In yet other example configurations, the electronic display mounting system 100 can be mounted to the desk surface 30 through a hole (e.g., grommet mount) located on the desk surface 30.

The truck assembly 70 can be movingly coupled to the riser assembly 50. The truck assembly 70 can be configured to move along at least a portion of the riser assembly 50. A counterbalance mechanism can be included inside the riser assembly 50. The counterbalance mechanism can be coupled to the riser assembly 50 and to the truck assembly 70. The counterbalance mechanism can be configured to counter at least a portion of the combined weight of all components (e.g., electronic display 10, arm assembly 60, and others) coupled to the truck assembly 70. In some example configurations, the truck assembly 70 can provide height adjustment for the display attachment bracket 45 relative to the desk surface 30.

The arm assembly 60 can be coupled to the truck assembly 70 on one end and the display attachment bracket 45 can be coupled to the other end. An electronic display 10 can be coupled to the display attachment bracket 45. The arm assembly 60 can be configured to adjust a position of the electronic display 10 relative to the riser assembly 50.

In some example configurations, a mount assembly (e.g., a tilt assembly 40) can be coupled to the arm assembly 60. The tilt assembly 40 can include a detachable display attachment bracket 45. The display attachment bracket 45 can be coupled to an electronic display (e.g., the electronic display 10 of FIG. 1). The tilt assembly 40 can adjust an angle of the electronic display 10 relative to the riser assembly 50 around a horizontal first axis, and it can provide rotation of the display attachment bracket 45 relative to the desk surface 30 around a vertical second axis.

FIG. 4 is an isometric view of the electronic display mounting system 100 of FIG. 2. In some example configurations, a mount assembly (e.g., a bow assembly 90) can be coupled to the arm assembly 60. One or more tilt assemblies 35 can be coupled to the bow assembly 90 to hold one or more electronic displays (e.g., to hold a first electronic display 11 and a second electronic display 12 of FIG. 2). The electronic display mounting system 100 with the bow assembly 90 can provide height adjustment and articulation for the one or more displays coupled to the electronic display mounting system 100.

Additional information regarding the electronic display mounting systems 100 of FIGS. 3-4 can be found in commonly assigned U.S. Pat. No. 11,112,057 to Janechek et al., which is incorporated by reference in its entirety.

Figure 5:
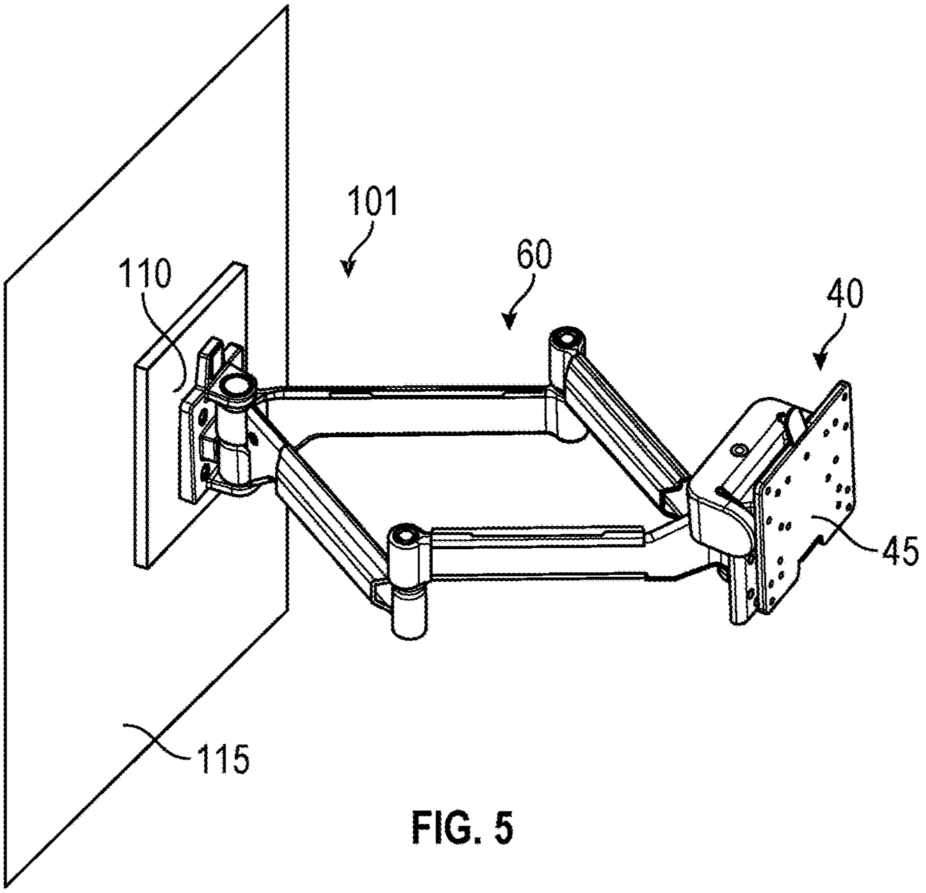
FIG. 5 is an isometric view of another example of an electronic display mounting system as it is mounted on a wall.

FIG. 5 is an isometric view of a wall mounted electronic display mounting system 101 according to another example configuration of the current disclosure. The electronic display mounting system 101 can include a wall mounting plate 110. The wall mounting plate 110 can be fixedly attached to a wall 115. In some example configurations, the arm assembly 60 can be coupled to the wall mounting plate 110. In other configurations, a riser assembly (e.g., a riser assembly like the riser assembly 50 of FIG. 1) can be coupled to the wall mounting plate 110 and the arm assembly 60 can be coupled to the riser assembly. The electronic display mounting system 101 of FIG. 5 can provide articulation for an electronic display coupled to the display attachment bracket 45 relative to the wall 115.

Figure 6:
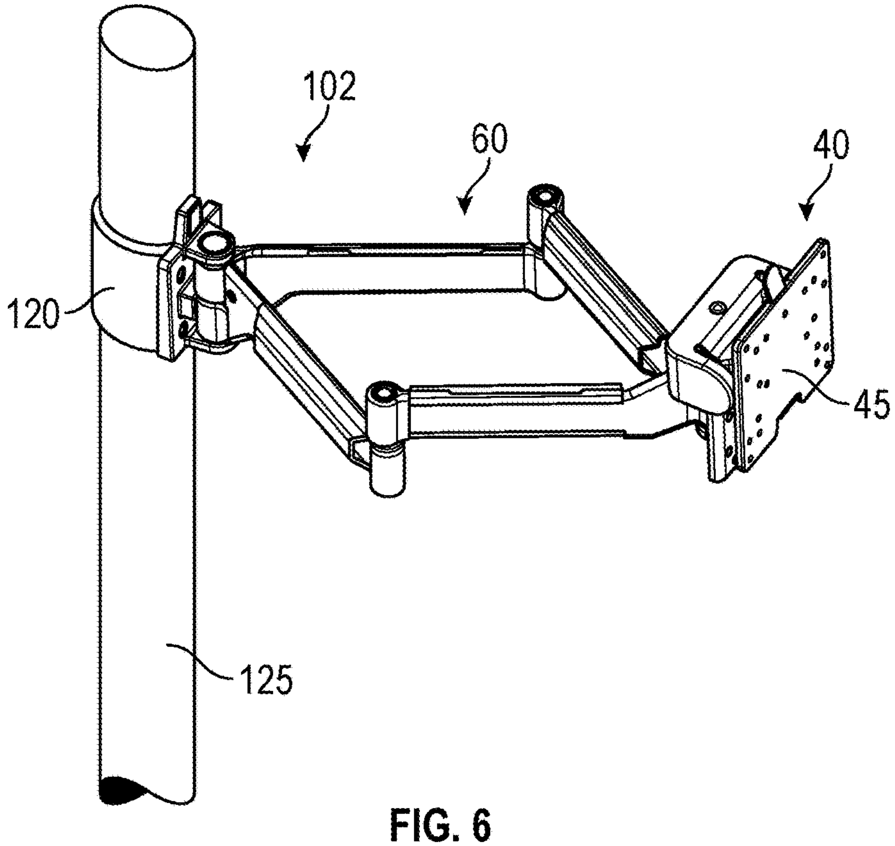
FIG. 6 is an isometric view of yet another example of an electronic display mounting system as it is mounted on a pole.

FIG. 6 is an isometric view of a pole mounted electronic display mounting system 102 according to yet another example configuration of the current disclosure. The electronic display mounting system 102 can include a brace 120. The brace 120 can be fixedly attached to a pole 125. In some example configurations, the arm assembly 60 can be coupled to the brace 120. In other configurations, a riser assembly (e.g., a riser assembly like the riser assembly 50 of FIG. 1) can be coupled to the brace 120 and the arm assembly 60 can be coupled to the riser assembly. The electronic display mounting system 102 of FIG. 6 can provide articulation for an electronic display coupled to the display attachment bracket 45 relative to a pole 125.

Figure 7:
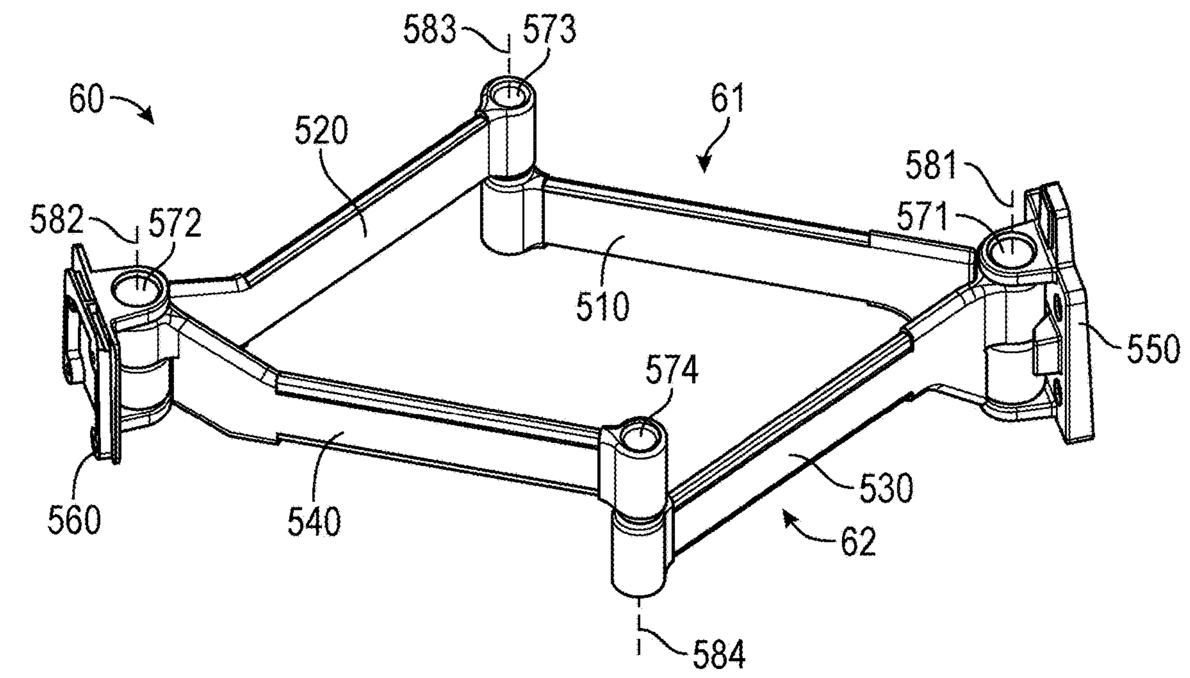
FIG. 7 is an isometric view of an example of an arm assembly.
Figure 8:
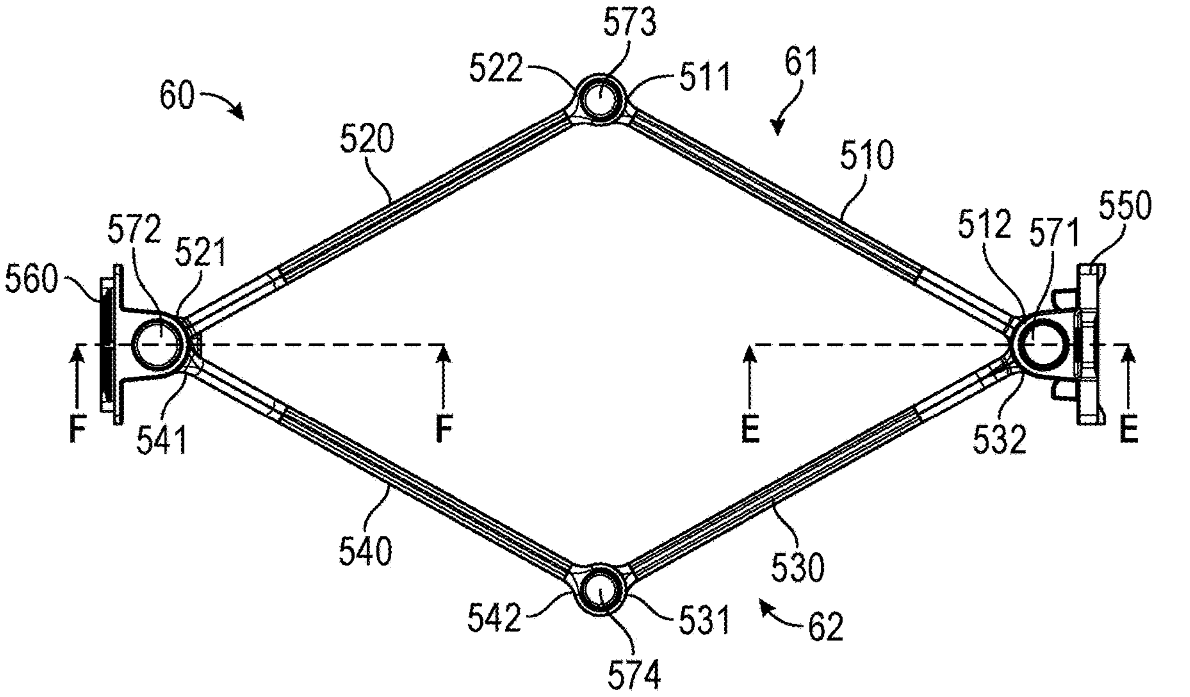
FIG. 8 is a top view of the arm assembly of FIG. 7.
Figure 9:
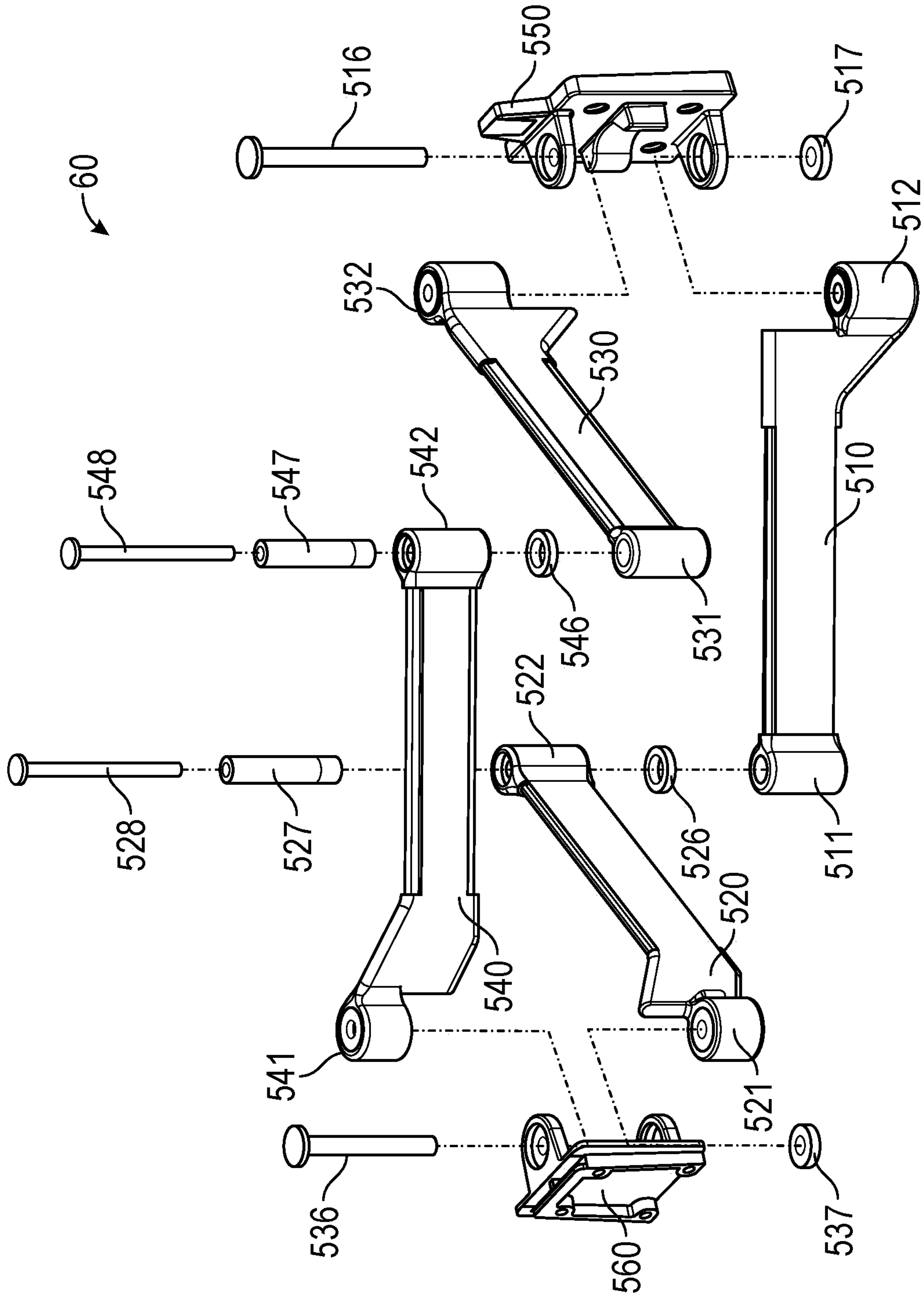
FIG. 9 is an exploded view of the arm assembly of FIG. 7.

FIGS. 7-8 show an isometric view and a top view of the arm assembly 60 of FIGS. 4-6 in an expanded configuration, respectively. FIG. 9 is an exploded view of the main components of the arm assembly 60. In some example configurations, the arm assembly 60 can include a first arm assembly 61 and a second arm assembly 62. The first arm assembly 61 and the second arm assembly 62 can include a pair of articulating arms.

The arm assembly 60 can include a first arm 510, a second arm 520, a third arm 530, and a fourth arm 540. The arm assembly 60 can further include a mounting bracket 550 and a holding bracket 560. The first arm 510 and the second arm 520 can form the first arm assembly 61, and the third arm 530 and the fourth arm 540 can form the second arm assembly 62. The first arm assembly 61 and the second arm assembly 62 can each be rotatingly coupled to the mounting bracket 550 at one of their ends and coupled to the holding bracket 560 at the other one of their ends. The arm assembly 60 can be used to change an orientation (e.g., transport, move, rotate, or the like) of the holding bracket 560 relative to the mounting bracket 550.

The first arm 510 can have a first end 511 and a second end 512, and the third arm 530 can have a first end 531 and a second end 532. The second end 512 of the first arm 510 and the second end 532 of the third arm 530 can be rotatingly coupled with the mounting bracket 550 (e.g., at a first hinge 571).

The second arm 520 can have a first end 521 and a second end 522, and the fourth arm 540 can have a first end 541 and a second end 542. The first end 521 of the second arm 520 and the first end 541 of the fourth arm 540 can be rotatingly coupled with the holding bracket 560 (e.g., at a second hinge 572.)

The first end 511 of the first arm 510 can be rotatingly coupled with the second end 522 of the second arm 520 at a third hinge 573. In some example configurations, a washer 526 can be located between the first arm 510 and the second arm 520, and a bushing 527 can be inserted through the first arm 510 and the second arm 520. The bushing 527 can be at least partially located inside the first arm 510 and the second arm 520. A mechanical fastener 528 (e.g., a screw, a rivet, or the like) can be inserted through the first arm 510, the bushing 527, and the second arm 520 to securely couple the first arm 510 with the second arm 520 to form the third hinge 573.

The first end 531 of the third arm 530 can be rotatingly coupled with the second end 542 of the fourth arm 540 at a fourth hinge 574. In some example configurations, a washer 546 can be located between the third arm 530 and the fourth arm 540, and a bushing 547 can be inserted through the third arm 530 and the fourth arm 540. The bushing 547 can be at least partially located inside the third arm 530 and the fourth arm 540. A mechanical fastener 548 (e.g., a screw, a rivet, or the like) can be inserted through the third arm 530, the bushing 547, and the fourth arm 540 to securely couple the third arm 530 with the fourth arm 540 to form the fourth hinge 574.

The first arm 510 and the second arm 520 can be configured to rotate relative to each other around a third axis 583. The third arm 530 and the fourth arm 540 can be configured to rotate relative to each other around a fourth axis 584. The first axis 581, the second axis 582, the third axis 583, and the fourth axis 584 can be parallel to each other and they can be oriented in a first direction (e.g., in vertical direction).

In some example configurations, the first arm 510 and the third arm 530 can be configured to rotate relative to the mounting bracket 550 around the same axis (e.g., a first axis 581). In other example configurations, the first arm 510 and the third arm 530 can be configured to rotate relative to the mounting bracket 550 around two separate axes that can be parallel to each other oriented in the first direction and they can be away from each other. Similarly, in some example configurations, the second arm 520 and the fourth arm 540 can be configured to rotate relative to the holding bracket 560 around the same axis (e.g., a second axis 582). In other example configurations, the second arm 520 and the fourth arm 540 can be configured to rotate relative to the holding bracket 560 around two separate axes that can be parallel to each other oriented in the first direction and they can be away from each other.

In some example configurations, the first arm 510, the second arm 520, the third arm 530, and the fourth arm 540 can be of equal lengths between their respective first ends and the second ends. In other configurations, the first arm 510 and the third arm 530 can have equal lengths (e.g., a first length), and the second arm 520 and the fourth arm 540 can have equal lengths (e.g., a second length). In some example configurations, the first length and the second length can be different (e.g., the second length can be smaller than the first length).

In some example configurations, the mounting bracket 550 of the arm assembly 60 can be coupled to a structure (e.g., coupled to the desk surface 30 of FIG. 3, or coupled to the wall of FIG. 5, or the pole of FIG. 6, or the like). Accordingly, the first arm 510 and the third arm 530 can be rotatably coupled to the structure.

Figure 10:
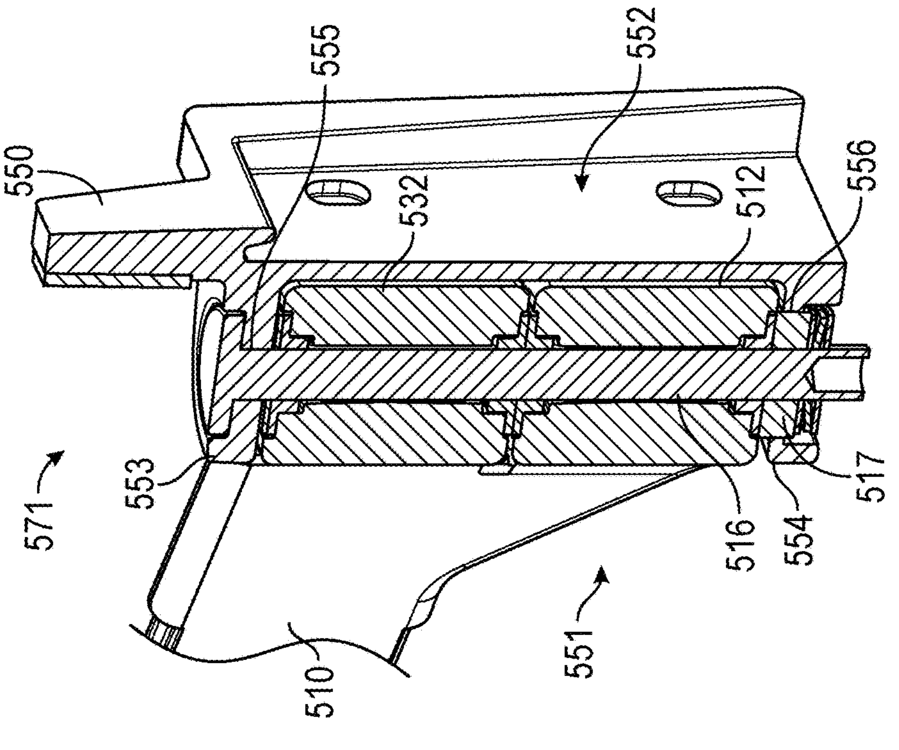
FIG. 10 is a cross-sectional view of the first hinge as it is viewed according to the cross-section E-E of FIG. 8.

FIG. 10 is a cross-sectional view of the first hinge 571 as it is viewed according to the cross-section E-E of FIG. 8. The mounting bracket 550 can have a front portion 551 and a rear portion 552. The rear portion 552 can be configured to be coupled to a structure (e.g., coupled to a desk surface, a wall, a pole, or the like). The front portion 551 can include a first bracket 553 and a second bracket 554 extending from the body of the mounting bracket 550 in transverse direction. The first bracket 553 and the second bracket 554 can be parallel to each other and they can be spaced apart from each other. A first aperture 555 (e.g., a round hole, or the like) and a second aperture 556 (e.g., a round hole, or the like) can be formed proximate the centers of the first bracket 553 and the second bracket 554, respectively. The first aperture 555 and the second aperture 556 can be coaxial.

The second end 512 of the first arm 510 and the second end 532 of the third arm 530 can be placed between the first bracket 553 and the second bracket 554 in stacked up fashion as illustrated in FIG. 10. A mechanical component 516 (e.g., a rivet, screw, or the like) can be inserted through the first aperture 555, the first arm 510, the third arm 530, and the second aperture 556 to form the first hinge 571. In some example configurations, a hollow bushing 517 can be located inside the second aperture 556 to provide support for the first hinge 571.

Figure 11:
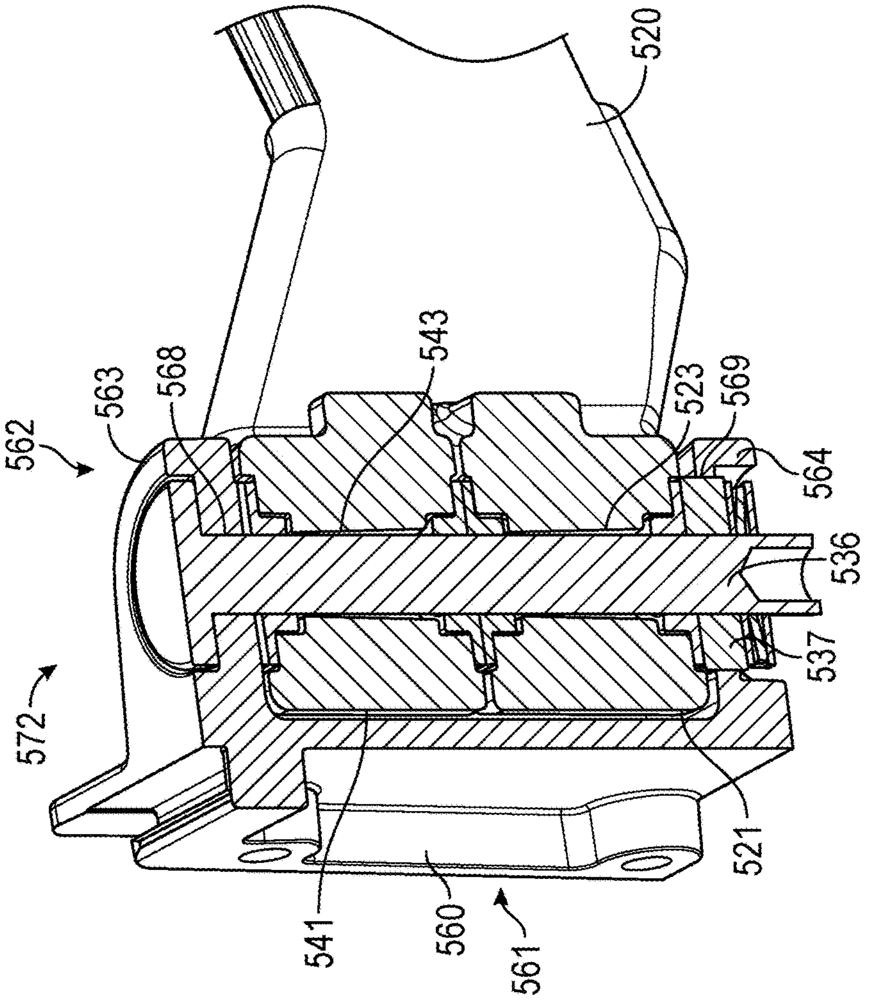
FIG. 11 is a cross-sectional view of the third hinge as it is viewed according to the cross-section D-D of FIG. 8.

FIG. 11 is a cross-sectional view of the second hinge 572 as it is viewed according to the cross-section F-F of FIG. 8. The holding bracket 560 can have a front portion 561 and a rear portion 562. The front portion 561 can be configured to be coupled to a mount assembly (e.g., the tilt assembly 40 of FIG. 3, the bow assembly 90 of FIG. 4, or the like). The rear portion 562 can include a first bracket 563 and a second bracket 564 extending from the body of the holding bracket 560 in transverse direction. The first bracket 563 and the second bracket 564 can be parallel to each other and they can be spaced apart from each other. A first aperture 568 (e.g., a round hole, or the like) and a second aperture 569 (e.g., a round hole, or the like) can be formed proximate the centers of the first bracket 563 and the second bracket 564, respectively. The first aperture 568 and the second aperture 569 can be coaxial.

The first end 521 of the second arm 520 and the first end 541 of the fourth arm 540 can be placed between the first bracket 563 and the second bracket 564 in stacked up fashion as illustrated in FIG. 11. A mechanical fastener 536 (e.g., a rivet, screw, or the like, shown in FIG. 9) can be inserted through the first aperture 568 on the first bracket 563, the second arm 520, the fourth arm 540, and the second aperture 569 on the second bracket 564 to form the second hinge 572. In some example configurations, a hollow bushing 537 (shown in FIG. 9) can be located inside the second bracket 564 to provide support for the second hinge 572.

Figure 12A:
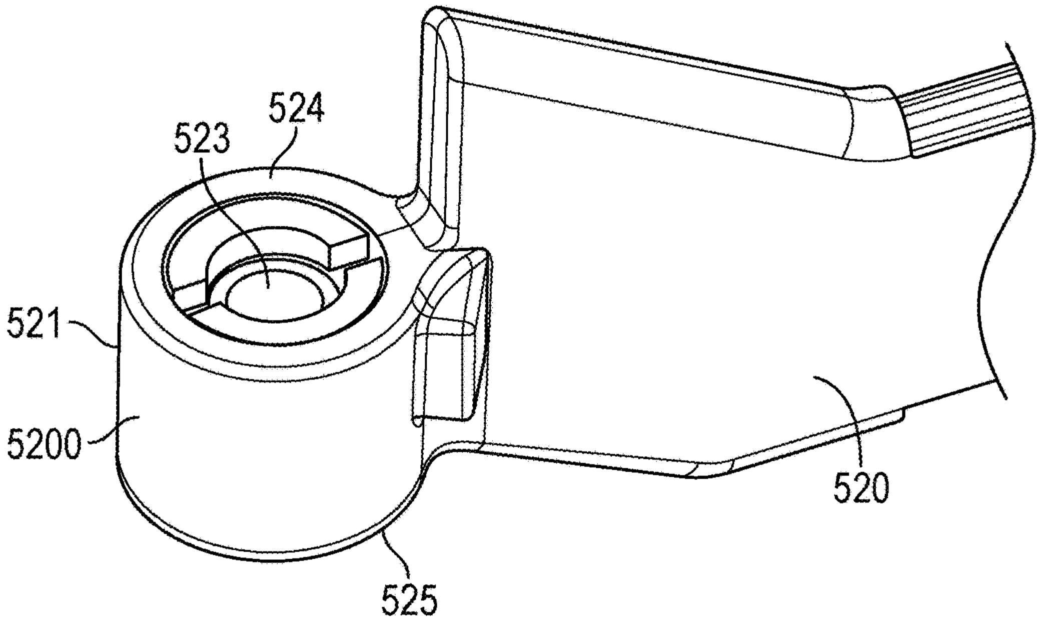
FIG. 12A is a partial isometric view of the front end of the second arm of FIG. 9.
Figure 12B:
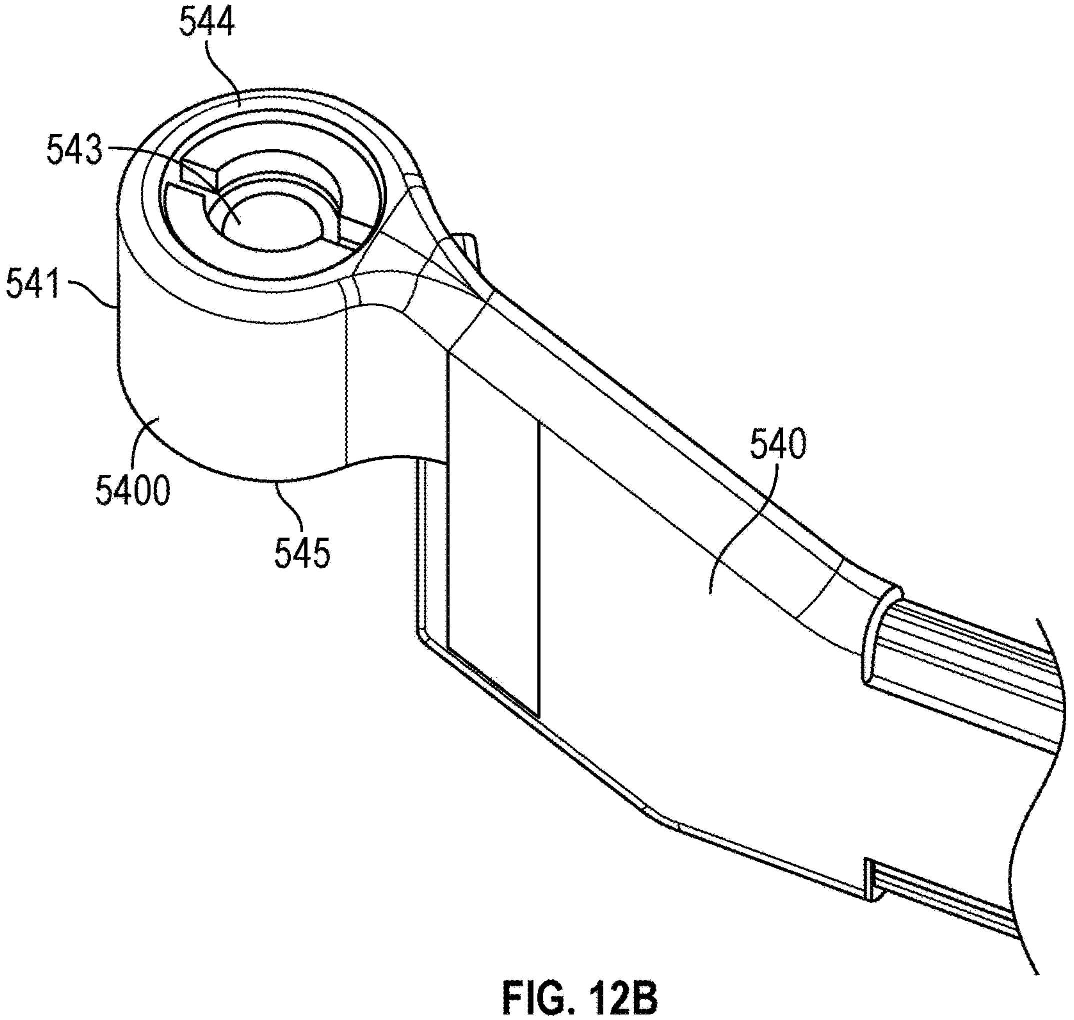
FIG. 12B is a partial isometric view of the front end of the fourth arm of FIG. 9.

FIG. 12A-12B are partial isometric views of the first end 521 of the second arm 520 and first end 541 of the fourth arm 540, respectively, according to example configurations of the current disclosure. A first connector 5200 can be formed proximate the first end 521 of the second arm 520 as illustrated in FIG. 12A. In some example configurations, the first connector 5200 can be formed as an integral part of the second arm 520 and it can have an upper end 524 and a lower end 525. In some example configurations, the first connector 5200 can have a partially round cross-section. A first through hole 523 can be formed on the first connector 5200 proximate to its center. The first through hole 523 can extend from the upper end 524 to the lower end 525 of the first connector 5200.

A second connector 5400 can be formed proximate the first end 541 of the fourth arm 540 as illustrated in FIG. 12B. The second connector 5400 can be formed as an integral part of the fourth arm 540 and it can have an upper end 544 and a lower end 545. In some example configurations, the second connector 5400 can have a partially round cross-section. A second through hole 543 can be formed on the second connector 5400 proximate to its center. The second through hole 543 can extend from the upper end 544 to the lower end 545 of the second connector 5400.

In some example configurations of the arm assembly 60, the first connector 5200 and the second connector 5400 can be configured to overlap to form the second hinge 572. The first through hole 523 and the second through hole 543 can be concentric when the first connector 5200 and the second connector 5400 overlap. In some example configurations, the second connector 5400 can be located above the first connector 5200 (e.g., the lower end 545 of the second connector 5400 can face the upper end 524 of the first connector 5200) as illustrated in FIG. 11. In other example configurations, the second connector 5400 can be located below the first connector 5200.

In a first example configuration (e.g., a single arm configuration where the first arm assembly 61 and the second arm assembly 62 are coupled to the holding bracket 560 as illustrated in FIGS. 3-4), both the first arm assembly 61 and the second arm assembly 62 can jointly support the holding bracket 560. A mount assembly (e.g., the tilt assembly 40 of FIG. 3, the bow assembly 90 of FIG. 4, or the like) can be coupled to the holding bracket 560. The single arm configuration can be useful to support heavy single or dual electronic displays. The first arm assembly 61 and the second arm assembly 62 can cooperate to provide articulation (move, transport, rotate, tilt, or the like) to one or more electronic displays coupled to the mount assembly.

In the single arm configuration, the first connector 5200 and the second connector 5400 can overlap and they can be located between the first bracket 563 and the second bracket 564 of the holding bracket 560 as illustrated in FIG. 11. The first through hole 523 and the second through hole 543 can be coaxial with the first aperture 568 and the second aperture 569 of the holding bracket 560. The mechanical fastener 536 can be inserted through the first aperture 568, the first through hole 523, the second through hole 543, and the second aperture 569 to form the second hinge 572.

Figure 13:
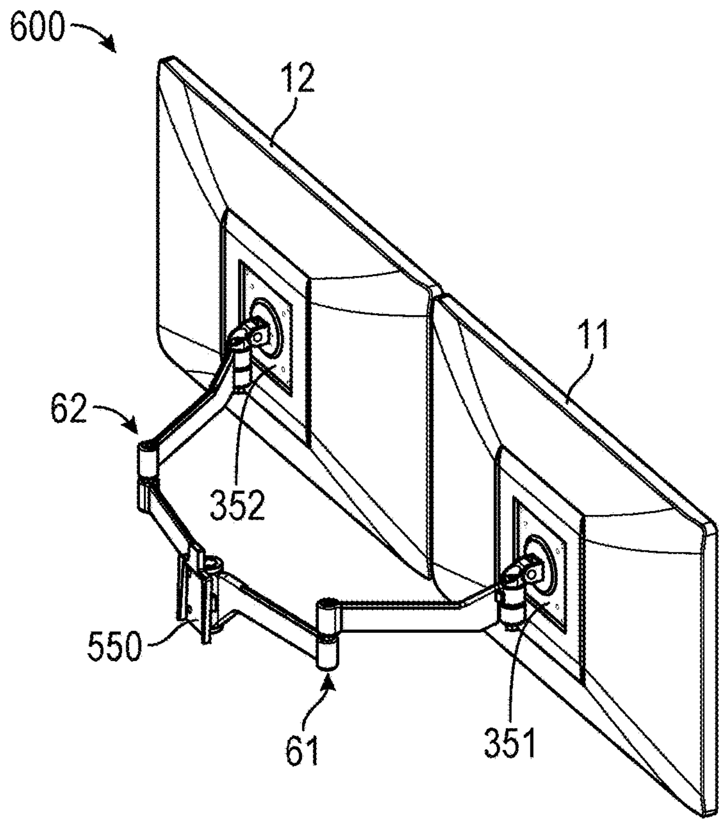
FIG. 13 is a rear isometric view of an electronic display mounting system for dual electronic displays according to an example configuration of the current disclosure.

FIG. 13 is a rear isometric view of an arm assembly 600 in a second example configuration (e.g., a dual arm configuration). In the dual arm configuration, the second hinge 572 of the single arm configuration 60 (shown on FIG. 7) can be disassembled by removing the mechanical fastener 536 to disengage the first arm assembly 61 and the second arm assembly 62 from the holding bracket 560. In the dual arm configuration, the first end 521 of the second arm 520 can be decoupled from the first end 541 of the fourth arm 540 such that the first arm assembly 61 and the second arm assembly 62 can be articulated independently.

Figure 14:
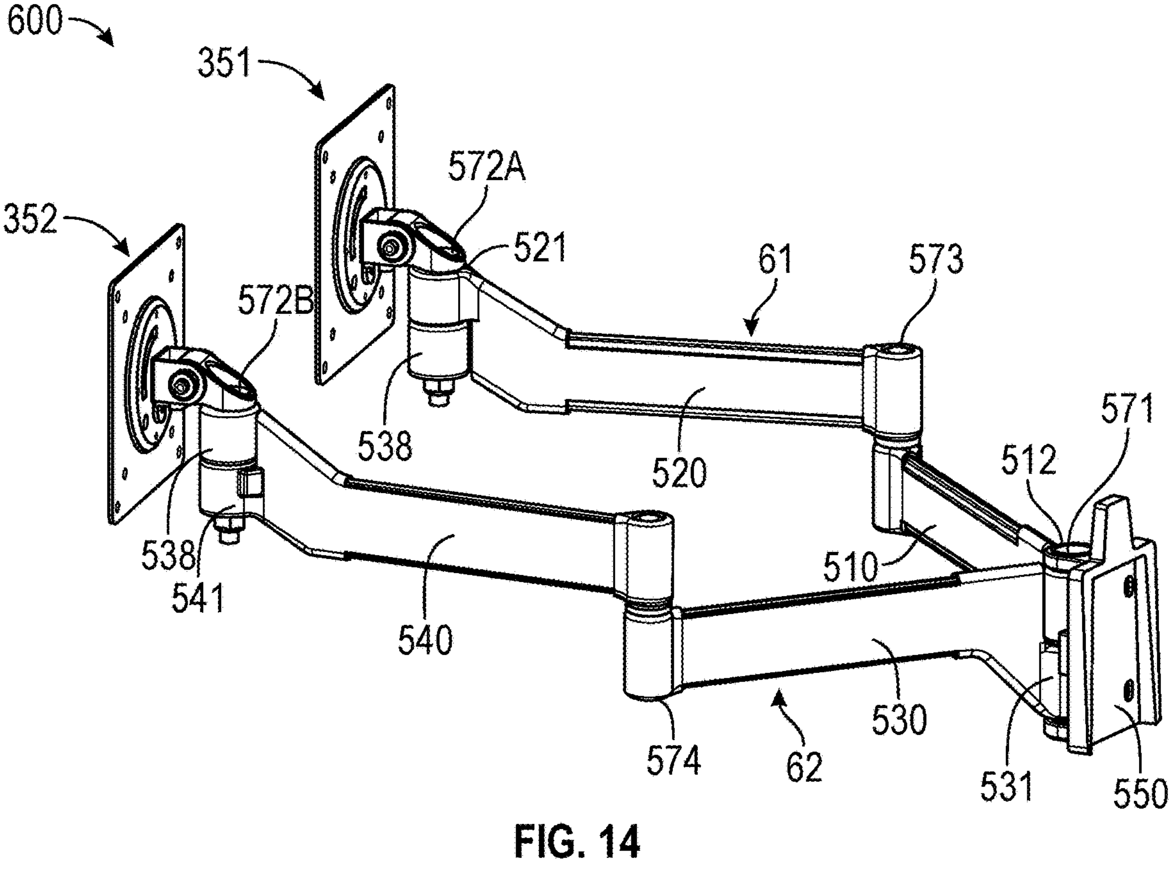
FIG. 14 is an isometric view of the arm assembly of the electronic display mounting system of FIG. 13.

FIG. 14 is an isometric view of the arm assembly 600 of FIG. 13 in the dual arm configuration. In the dual arm configuration, the first arm assembly 61 and the second arm assembly 62 can be constructed similar to the single arm configuration. The rear end of the first arm assembly 61 (e.g., the second end 512 of the first arm 510) and the rear end of the second arm assembly 62 (e.g., the second end 532 of the third arm 530) can be rotatingly coupled to the mounting bracket 550.

In the dual arm configuration, a first tilt assembly 351 can be rotatingly coupled to the front end of the first arm assembly 61 (e.g., coupled to the first end 521 of the second arm 520) at a first arm assembly second hinge 572A, and a second tilt assembly 352 can be rotatingly coupled to the front end of the second arm assembly 62 (e.g., coupled to the first end 541 of the fourth arm 540) at a second arm assembly second hinge 572B. A first electronic display 11 and a second electronic display 12 can be coupled to the first tilt assembly 351 and the second tilt assembly 352, respectively, as illustrated in FIG. 13. The first electronic display 11 and the second electronic display 12 can be transported (e.g., moved, rotated, tilted, or the like) individually by articulating the one or both of the first arm assembly 61 and the second arm assembly 62 independent of each other. The dual arm configuration can be useful to support two light weight displays. The dual arm configuration can also be useful to change the orientation of the first electronic display 11 and the second electronic display 12 relative to each other (e.g., to orient them side by side or back-to-back alternatingly as illustrated in FIGS. 2A-2B, respectively).

Figure 15:
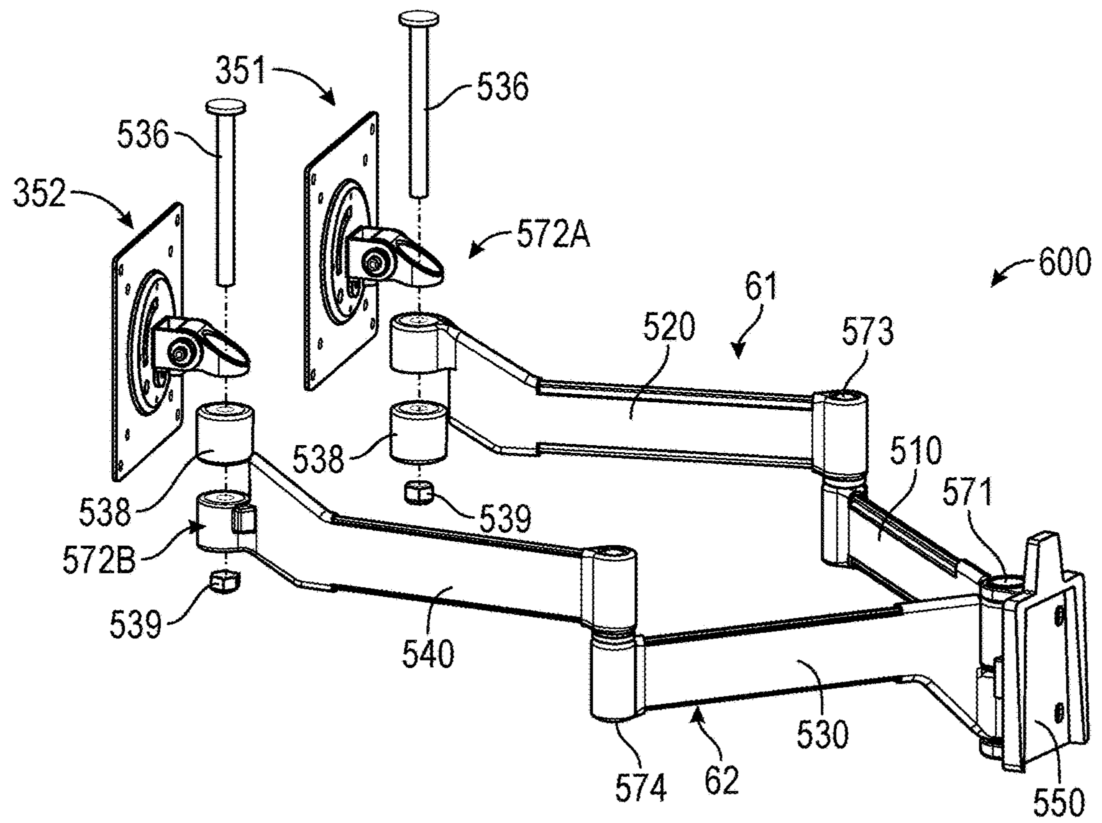
FIG. 15 is a partially exploded view of the arm assembly of FIG. 14.

FIG. 15 is a partially exploded view of the arm assembly 600 of FIG. 14. A spacer 538 can be used to level the mounting surfaces of the first tilt assembly 351 and the second tilt assembly 352 where they can be coupled to the first arm assembly 61 and the second arm assembly 62, respectively. Depending on the configurations of the front end of the second arm 520 (e.g., the first connector 5200)

and the front end of the fourth arm 540 (e.g., the second connector 5400) relative to each other in the single arm configuration (e.g., the second connector 5400 can be above the first connector 5200 as illustrated in FIG. 11), the spacer 538 can be located either above or below the front ends of the second arm 520 and the fourth arm 540 in the dual arm configuration (e.g., below the first connector 5200 and above the second connector 5400 as illustrated in FIG. 15) to level the tilt mounting surfaces.

In some example configurations, the second hinge (e.g., the first arm assembly second hinge 572A or the second arm assembly second hinge 572B of FIG. 15) can include a nut 539. The mechanical fastener 536 (e.g., a rivet, screw, or the like) can be inserted through apertures located proximate the rear end of the tilt assembly (e.g., the first tilt assembly 351 or the second tilt assembly 352), the arm assembly (e.g., the first arm assembly 61 or the second arm assembly 62) and the spacer 538, and engage with the nut 539 to form the second hinge as illustrated in FIG. 15. In some example configurations, the nut 539 can be a knob, a thumb screw, or the like, for toolless assembly of the second hinge 572.

A user of the electronic display mounting system can selectively change the configuration of the arm assembly 60 between the single arm configuration and the dual arm configuration utilizing one or more techniques described above. The user of the electronic display mounting system can bring the front end of the first arm assembly 61 (e.g., the first connector 5200) and the front end of the second arm assembly 62 (e.g., the second connector 5400) together in a single second hinge 572 (as illustrated in FIG. 7) to form the single arm configuration. Or, the user of the electronic display mounting system can separate the second hinge in to two parts (e.g., the first arm assembly second hinge 572A and the second arm assembly second hinge 572B) by moving the front end of the first arm assembly 61 (e.g., the first connector 5200) and the front end of the second arm assembly 62 (e.g., the second connector 5400) away from each other (as illustrated in FIGS. 13-15) to form the dual arm configuration.

Figure 16:
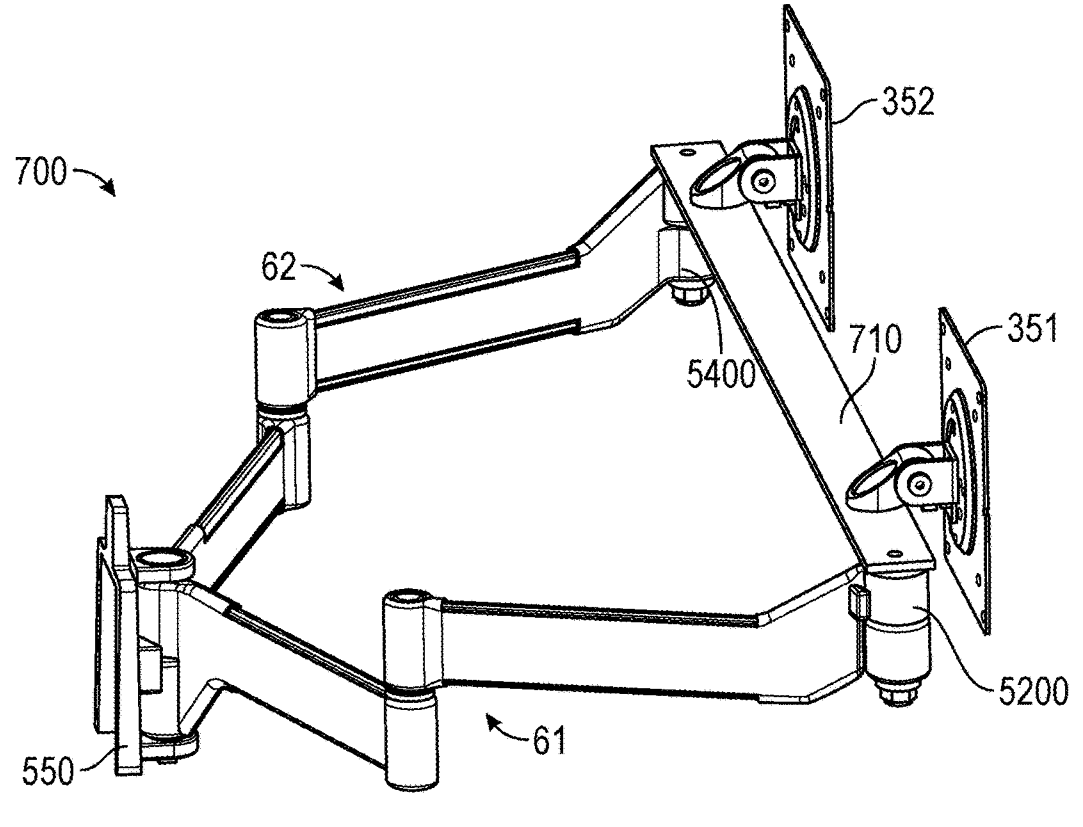
FIG. 16 is an isometric view of an arm assembly according to another example configuration of the current disclosure.

FIG. 16 is an isometric view of an arm assembly 700 according to an example configuration of the current disclosure. A spanner bracket 710 can be coupled between the first end of the first arm assembly 61 and the first end of the second arm assembly 62 (e.g., coupled between the first connector 5200 and the second connector 5400). The spanner bracket 710 can be configured to synchronize the movement of the first arm assembly 61 and the second arm assembly 62. One or more tilt assemblies (e.g., the first tilt assembly 351 and the second tilt assembly 352) can be coupled to the spanner bracket 710 to couple one or more electronic displays to the arm assembly 700.

In some example configurations, the spanner bracket 710 can have a first portion and a second portion. The first portion and the second portion can slide relative to each other to adjust a length of the spanner bracket to maintain a desired distance between the first connector 5200 and a second connector 5400.

Additional Notes and Aspects

Aspect 1 may include or use subject matter (such as an apparatus, a system, a device, a method, a means for performing acts, or a device readable medium including instructions that, when performed by the device, may cause the device to perform acts), such as may include or an electronic display mounting system comprising: one or more electronic display interfaces; a support assembly adapted to couple to a structure, the support assembly including: a mounting bracket configured to couple to the structure; and an articulating arm assembly operably coupled between the one or more electronic display interfaces and the mounting bracket; wherein the articulating arm assembly is configured to translate the one or more electronic display interfaces between a first position proximate the mounting bracket and a second position spaced apart from the mounting bracket.

Aspect 2 may include or use or may optionally be combined with the subject matter of Aspect 1, to optionally include or use, wherein the articulating arm assembly including at least one pair of arms.

Aspect 3 may include or use or may optionally be combined with the subject matter of Aspect 1, to optionally include or use, wherein the structure is selected from a group consisting of a desk surface, a wall, a pole, a cabinet, a support column, a cart, and a rack.

Aspect 4 may include or use, or may optionally be combined with the subject matter of Aspect 1, to optionally include or use, wherein the articulating arm assembly comprises: a first pair of pivotally connected arms including: a first end configured to be rotatingly coupled to the mounting bracket; and a second end having a first connector; and a second pair of pivotally connected arms including: a first end configured to be rotatingly coupled to the mounting bracket; and a second end having a second connector; wherein the first connector is configured to be elevated relative to the second connector.

Aspect 5 may include or use, or may optionally be combined with the subject matter of Aspect 4, to optionally include or use, wherein the articulating arm assembly is configured in either one of a single arm configuration or a dual arm configuration, wherein the first connector and the second connector are configured to overlap and coupled to each other in the single arm configuration; and wherein the first connector and the second connector are configured to be positioned away from each other and adapted to translate independent of each other in the dual arm configuration.

Aspect 6 may include or use or may optionally be combined with the subject matter of Aspect 5, to optionally include or use, wherein the electronic display mounting system further comprises a holding bracket, and wherein the first connector and the second connector are rotatingly coupled to the holding bracket in the single arm configuration.

Aspect 7 may include or use or may optionally be combined with the subject matter of Aspect 6, to optionally include or use, wherein the one or more electronic display interfaces are coupled to the holding bracket in the single arm configuration.

Aspect 8 may include or use or may optionally be combined with the subject matter of Aspect 5, to optionally include or use, wherein the electronic display mounting system further comprises a spacer, and wherein the spacer is coupled to one or both of the first connector and the second connector in the dual arm configuration.

Aspect 9 may include or use or may optionally be combined with the subject matter of Aspect 8, to optionally include or use, wherein the one or more electronic display interfaces include a first electronic display interface and a second electronic display interface, and wherein the first electronic display interface is adapted to be rotatingly coupled to the first connector and the second electronic display interface is adapted to be rotatingly coupled to the second connector.

Aspect 10 may include or use or may optionally be combined with the subject matter of Aspect 8, to optionally include or use, wherein the electronic display mounting system further comprises a spanner bracket having a first end and a second end, and wherein the first end is adapted to be rotatingly coupled to the first connector and the second end is adapted to be rotatingly coupled to the second connector.

Aspect 11 may include or use or may optionally be combined with the subject matter of Aspect 10, to optionally include or use, wherein the spanner bracket has a first portion and a second portion slidably engaged with the first portion, and wherein the first portion and the second portion can slide relative to each other to adjust a distance between the first end and the second end of the spanner bracket.

Aspect 12 may include or use or may optionally be combined with the subject matter of Aspect 10, to optionally include or use, wherein the one or more electronic display interfaces are coupled to the spanner bracket.

Aspect 13 may include or use or may optionally be combined with the subject matter of Aspect 7, to optionally include or use, wherein one or more electronic displays are coupled to the one or more electronic display interfaces; and wherein the articulating arm assembly is adapted to provide articulation for the one or more electronic displays relative to the mounting bracket simultaneously.

Aspect 14 may include or use or may optionally be combined with the subject matter of Aspect 9, to optionally include or use, wherein a first electronic display is coupled to the first electronic display interface and a second electronic display is coupled to the second electronic display interface, and wherein the articulating arm assembly is adapted to provide articulation to the first electronic display and the second electronic display independent of each other.

Aspect 15 may include or use or may optionally be combined with the subject matter of Aspect 12, to optionally include or use, wherein one or more electronic displays are coupled to the one or more electronic display interfaces, and wherein the articulating arm assembly is adapted to provide articulation to the one or more electronic displays relative to the mounting bracket simultaneously.

Aspect 16 may include or use, or may optionally be combined with the subject matter of Aspect 10, to optionally include or use, further comprising: one or more mechanical fastener; wherein the one or more mechanical fasteners are inserted through the one or more of the holding bracket, a first electronic display interface, the first pair of pivotally connected arms, the second pair of pivotally connected arms, the spacer and the spanner bracket to configure the articulating arm assembly in one of the single arm configuration or the dual arm configuration, selectively, and one or more nuts; wherein the one or more fasteners are threadingly engaged with the one or more nuts to secure the articulating arm assembly in one of the single arm configuration or the dual arm configuration.

Each of these non-limiting examples can stand on its own or can be combined in any permutation or combination with any one or more of the other examples.

The above detailed description includes references to the accompanying drawings, which form a part of the detailed description. The drawings show, by way of illustration, specific embodiments in which the present subject matter can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the present subject matter should be determined with reference to the appended claims, along with the full scope of equivalents to which such claims are entitled.

The invention claimed is:

1. An electronic display mounting system comprising:
one or more electronic display interfaces;
a support assembly adapted to couple to a structure, the support assembly including:
  a mounting bracket configured to couple to the structure; and
  an articulating arm assembly operably coupled between the one or more electronic display interfaces and the mounting bracket, the articulating arm assembly selectively configurable between a single arm configuration and a dual arm configuration, the articulating arm assembly including:
    a first pair of pivotally connected arms including:
      a first end rotatably coupled to the mounting bracket; and
      a second end rotatably coupled to the one or more electronic display interfaces; and
    a second pair of pivotally connected arms including:
      a first end rotatably coupled to the mounting bracket; and
      a second end rotatably coupled to the one or more electronic display interfaces; and
a holding bracket selectively couplable to the articulating arm assembly to transition the articulating arm assembly between the single arm configuration and the dual arm configuration;

wherein the articulating arm assembly is configured to translate the one or more electronic display interfaces between a first position proximate the mounting bracket and a second position spaced apart from the mounting bracket.

2. The electronic display mounting system of claim 1, wherein the structure is selected from a group consisting of a desk surface, a wall, a pole, a cabinet, a support column, a cart, and a rack.

3. The electronic display mounting system of claim 1, wherein the articulating arm assembly includes:

a first connector built in the second end of the first pair of pivotally connected arms; and a second connector built in the second end of the second pair of pivotally connected arms;

wherein the holding bracket is configured to rotatably couple the first connector and the second connector in the single arm configuration, and wherein the first connector and the second connector are configured to be positioned away from each other and adapted to translate independently of each other in the dual arm configuration.

4. The electronic display mounting system of claim 3, wherein, in the single arm configuration, the first connector is elevated relative to the second connector and at least a portion of the first connector overlaps with and is coupled to at least a portion of the second connector.

5. The electronic display mounting system of claim 4, comprising a spacer couplable to one or both of the first connector and the second connector in the dual arm configuration.

6. The electronic display mounting system of claim 5, wherein the one or more electronic display interfaces include a first electronic display interface and a second electronic display interface, and wherein, in the dual arm configuration, the first electronic display interface is adapted to be rotatably coupled to the first connector and the second electronic display interface is adapted to be rotatably coupled to the second connector.

7. The electronic display mounting system of claim 6, wherein a first electronic display is coupled to the first electronic display interface and a second electronic display is coupled to the second electronic display interface, and wherein the articulating arm assembly is adapted to provide articulation to the first electronic display and the second electronic display independently of each other in the dual arm configuration.

8. The electronic display mounting system of claim 5, wherein the electronic display mounting system further comprises a spanner bracket having a first end and a second end, and wherein, in the dual arm configuration, the first end of the spanner bracket is adapted to be rotatably coupled to the first connector and the second end of the spanner bracket is adapted to be rotatably coupled to the second connector.

9. The electronic display mounting system of claim 8, wherein the spanner bracket has a first portion and a second portion slidably engaged with the first portion, and wherein the first portion and the second portion can slide relative to each other to adjust a distance between the first end and the second end of the spanner bracket.

10. The electronic display mounting system of claim 8, wherein the one or more electronic display interfaces are coupled to the spanner bracket in the dual arm configuration.

11. The electronic display mounting system of claim 10, wherein one or more electronic displays are coupled to the one or more electronic display interfaces, and wherein the articulating arm assembly is adapted to provide articulation to the one or more electronic displays relative to the mounting bracket simultaneously in the dual arm configuration.

12. The electronic display mounting system of claim 8, further comprising:

one or more mechanical fasteners;

wherein the one or more mechanical fasteners are inserted through one or more of the holding bracket, a first electronic display interface, the first pair of pivotally connected arms, the second pair of pivotally connected arms, the spacer, or the spanner bracket to configure the articulating arm assembly in one of the single arm configuration or the dual arm configuration, selectively, and one or more nuts; wherein the one or more mechanical fasteners are threadedly engaged with the one or more nuts to secure the articulating arm assembly in one of the single arm configuration or the dual arm configuration.

13. The electronic display mounting system of claim 3, wherein the one or more electronic display interfaces are coupled to the holding bracket in the single arm configuration.

14. The electronic display mounting system of claim 13, wherein one or more electronic displays are coupled to the one or more electronic display interfaces; and wherein the articulating arm assembly is adapted to provide articulation for the one or more electronic displays relative to the mounting bracket simultaneously in the dual arm configuration.

15. An electronic display mounting system comprising:

a mounting bracket couplable to a structure;

one or more electronic display interfaces;

an arm assembly operably coupled between the one or more electronic display interfaces and the mounting bracket, the arm assembly including:

a first set of arms including:

a first arm rotatably couplable to the mounting bracket; and a second arm pivotally couplable to the first arm; and a second set of arms including:

a third arm rotatably couplable to the mounting bracket; and a fourth arm pivotally couplable to the third arm; and a coupling member couplable to the second arm and the fourth arm, the coupling member movable relative to the arm assembly to selectively configure the arm assembly between:

a first configuration where the coupling member is configured to couple the second arm and the fourth arm to a first electronic display interface of the one or more electronic display interfaces; and a second configuration where the second arm is couplable to the first electronic display interface of the one or more electronic display interfaces, and the fourth arm is couplable to a second electronic display interface of the one or more electronic display interfaces.

16. The electronic display mounting system of claim 15, wherein the coupling member includes:

a first bracket; and a second bracket; and wherein at least a portion of the second arm and at least a portion of the fourth arm are coupled between the first bracket and the second bracket in the first configuration.

17. The electronic display mounting system of claim 16, comprising a fastener insertable through the first bracket, the second bracket, the second arm, and the fourth arm to rotatably couple the second arm and the fourth arm to the coupling member in the first configuration.

18. The electronic display mounting system of claim 15, wherein, in the first configuration, the coupling member couples the second arm to the fourth arm such that movement of the second arm corresponds with movement of the fourth arm.

19. The electronic display mounting system of claim 18, wherein, in the second configuration, the second arm is independently movable relative to the fourth arm.

20. The electronic display mounting system of claim 15, wherein the first arm and the third arm are rotatably coupled to the mounting bracket about a common axis.

* * * * *